350-96.25 SR

XR 3,585,282

[redacted] [redacted] TX 3094T

United States

[11] 3,585,282

[72] Inventor William Bell
Leeds, England
[21] Appl. No. 822,124
[22] Filed May 6, 1969
[45] Patented June 15, 1971
[73] Assignee The Rank Organization Limited
London, England
[32] Priority May 13, 1968
[33] Great Britain
[31] 22,559/68

[54] OPTICAL ARRANGEMENT FOR COLOR TELEVISION CAMERA EMPLOYING FIBER OPTICS
10 Claims, 12 Drawing Figs.

[52] U.S. Cl. 178/5.4, 350/96
[51] Int. Cl. H04n 9/08
[50] Field of Search 178/5.4, 6 ited
UNITED STATES PATENTS

| | | | |
|---|---|---|---|
| 3,130,263 | 4/1964 | Manning | 178/5.4 |
| 3,267,209 | 8/1966 | Nagamori et al. | 178/5.4 |

OTHER REFERENCES

RCA Technical Note No. 136 Received in Group March 12, 1958 Copy in 178 5.4 0

*Primary Examiner*—Robert L. Richardson
*Attorney*—Griffin and Branigan

ABSTRACT: Apparatus for producing a plurality of images of different colors from a polychromatic image comprising an image dissector which splits the image into separate beams, a dispersing prism dispersing the beams into beams of differing colors and a light guide designed to the dissector and prism to gather the beams of each individual color and combine same into a colored image at the output end of the light guide.

3585282
OR IN 358/55

OPTICAL ARRANGEMENT FOR COLOR TELEVISION CAMERA EMPLOYING FIBER OPTICS

This invention relates to the derivation of a plurality of component images from a primary image and to apparatus therefor.

Accordingly there is provided apparatus for the separation of a polychromatic image into a plurality of component images having different chromatic characteristics, comprising a fiber optic image splitter formed from a coherent bundle of light conductive guides having their inputs arranged in groups containing one fiber for each image of said plurality and having their outputs arranged so that each group contributes one light guide to the formation of each image, and chromatic selection means associated with the light guides forming at least one of said component images to control the chromatic characteristics thereof.

In, for example, a color television camera the primary image formed by the camera lens is broken down into a plurality of component images. These may provide electrical signals corresponding to the red, green and blue components of the primary image. From these signals chrominance and luminance television signals are in turn derived.

Conventionally, the primary image is separated into its individual components by means of dichroic mirrors which direct light rays of different wavelength on to different pickup tubes.

We have now found that the separation of a primary polychromatic image may conveniently be achieved by use of fiber optic image splitter.

Our invention will now be further explained by way of the following description of various embodiments and by reference to the accompanying drawings in which.

Figure 1:
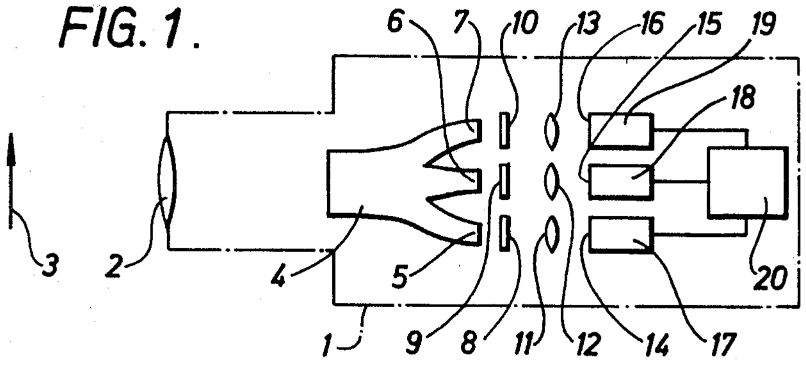
FIG. 1 shows in diagrammatic form, a color television camera incorporating a simple form of image separation apparatus using a fiber optic image splitter.

Referring now to the drawings, FIG. 1 shows a color television camera represented by the broken line 1. An object lens 2 views an object 3 and forms a polychromatic primary image thereof on the front or input face of an image splitter 4 composed of a plurality of light conductive guides. Reduced images are formed on each of the three output faces 5, 6, 7. Red, green and blue color filters 8, 9, 10 are placed adjacent to these output faces in the paths of the light beans. Three further lenses 11, 12, 13 serve to focus red, blue and green images on the targets 14, 15, 16 of pickup tubes 17, 18, 19 which generate appropriate electrical signals. The outputs of the pickup tubes are fed to translating circuits 20 from which are derived chrominance and luminance signals.

Figure 2A:
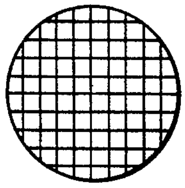
FIGS. 2A, 2B and 2C show the input face layout and output faces of the image splitter of FIG. 1.
Figure 2B:
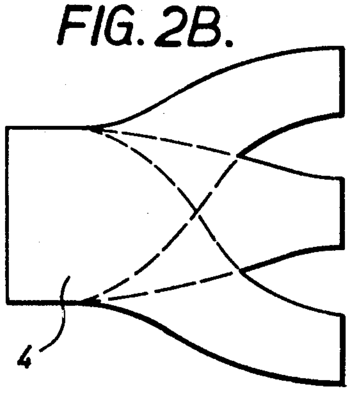
Figure 2C:
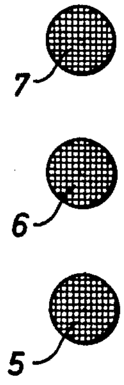

The construction of the image splitter is shown in FIGS. 2A to C. The input face is composed of a matrix of groups of three light guides. One guide of each group leads to each of the output faces to form a coherent reduced image of the light entering at the input face. The light guides may be either rigid or flexible, but the latter has the advantage that the position of the output image may readily be adjusted.

Figure 3:
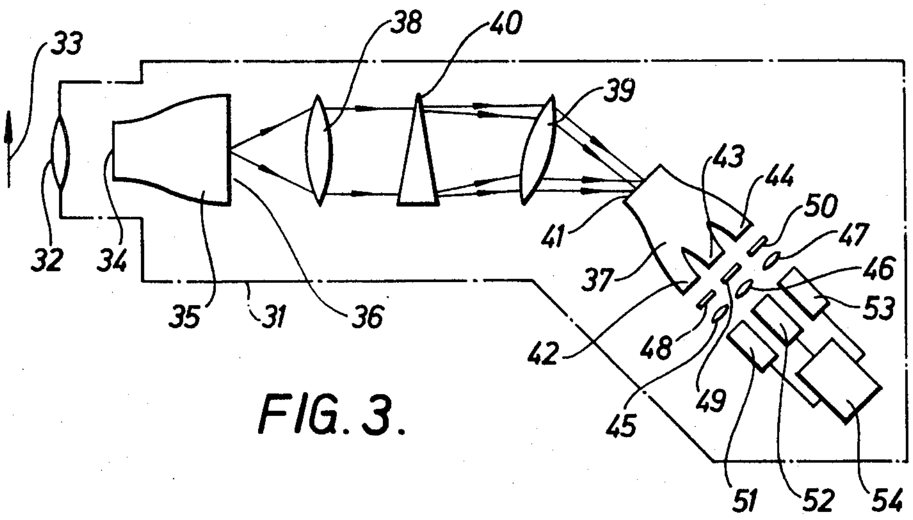
FIG. 3 shows a more elaborate image separation apparatus using an image dissector.

The simple system described above has the disadvantage that its efficiency is only one third of that of a straightforward dichroic mirror system due to reduction in image size in the image splitter. This disadvantage may be overcome, however, by using the more elaborate apparatus shown in FIG. 3.

In this case, in camera 31, an object lens 32 views an object 33 and forms a primary image on the front face 34 of image dissector 35. The dissected image is transmitted to back face 36 where it is separated into bands. The separated image is focused on the front face of an image separator 37 by means of a dispersive element comprising lenses 38, 39 and a prism 40. The dispersive element serves to form separated images corresponding to the red, green and blue components of the image. The light guides forming image separator 37 are separated into groups of three bands on the imputor front face 41, one band of each group assisting in the formation of each of the three separated images on the output surfaces 42, 43, 44. As in the previous case lenses 45, 46, 47 preceded by red, green and blue filters 48, 49, 50 form images on the targets of pickup tubes 51, 52, 53 the outputs being combined to form luminance and chrominance signals in the associated circuits 54.

Figure 4A:
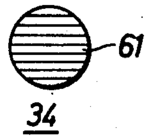
FIGS. 4A, 4B and 4C show input face, layout and output face of the image dissector of FIGS. 5A, 5B, 5C show the input face, layout and output faces of the image splitters shown in FIG. 3.
Figure 4B:
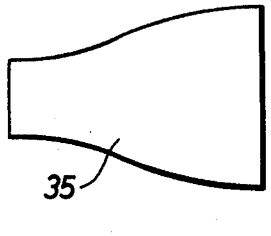
Figure 4C:
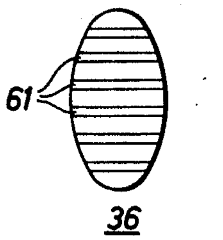
Figure 5A:
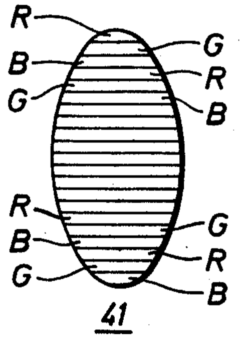
Figure 5B:
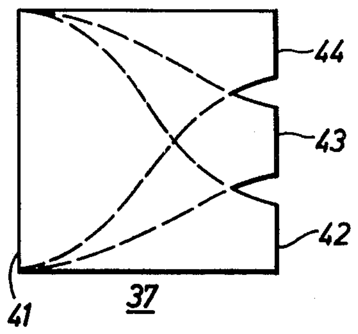
Figure 5C:
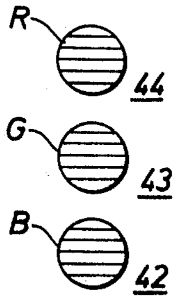

Image dissector 35 is illustrated in greater detail in FIGS. 4A, 4B and 4C. At the input face 34 the ends of the constituent light guides are arranged in bands 61. At the output face 36 these bands are spaced apart by a separation equal to at least twice their width. This permits the loss of efficiency of the simple apparatus shown in FIG. 1 to be avoided. This is achieved by use of the dispersive element which is so arranged that the image of each band at the back face of the image dissector is spread spectrally over three times its width. In association with the dissector, an image splitter having the construction shown in FIGS. 5A, 5B, 5C is used. At the input face 41 the ends of the light guides are arranged in bands in groups of three. The image of each band on the image dissector output produced at this face is arranged so that it just covers three of these bands, due to the spectral dispersion of the dispensive element. Thus each third band will contain the red components of the image and its neighbors the green and blue components. The light guides are arranged so that their outputs are disposed in three output faces 42, 43, 44, each face being coupled with each third band and serving to display red, green and blue images. Since color separation is inherent in this arrangement it is not strictly necessary to provide filters. However, their presence may be desirable to modify the cutoff characteristic of each image.

Figure 6:
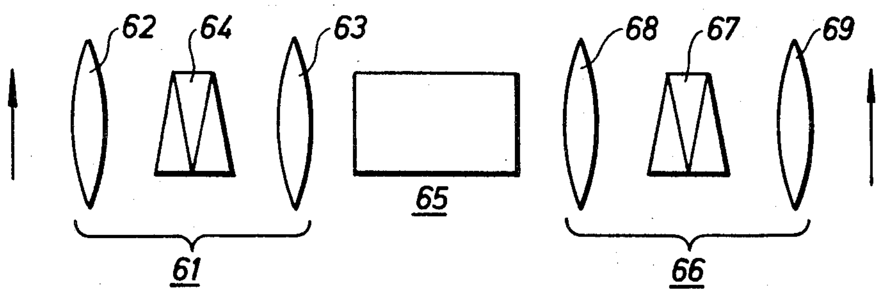
FIG. 6 shows a wavelength multiplexing apparatus which may be used in association with one or more of the fiber optic components shown in the previously illustrated embodiments.

In order to improve the resolution of either of the forms of apparatus described, the technique of wavelength multiplexing may be employed in association with any of the fiber optic components. Suitable auxiliary apparatus to permit this is shown in FIG. 6. This comprises a dispersive element 61 consisting of a pair of lenses 62, 63 and a direct view prism 64. This disperses the image points into a spectrum prior to entry into the fiber optic component 65. As a result of this each image point is shared on a wavelength basis by a number of fibers. At the output there is placed a complementary dispersive element 66 consisting of a further prism 67 and pair of lenses 68, 69, which reverses the dispersion of the emergent image. Thus the effect of a broken fiber is not to destroy an image point, but merely to change the color of a number of points, greatly improving resolution.

It will be apparent that in the second form of the apparatus the plane of multiplexing must be perpendicular to that of the dispersion induced to improve the efficiency of the image separator.

Although the apparatus described is arranged to give only three output images, modifications may readily be made to give any desired number. In the more complex version the pitch of the layers at the output of the dissector will be MD where M is the magnification of the lens systems and D is the height of the basic periodic unit in the input face of the image splitter.

Separate filters need not be used, as, for example, light guides having different transmission characteristics may be employed for different image displays.

The diameter of the fibers in the dissector will be determined by the wavelength selection and resolution required.

I claim:

1. Apparatus for the separation of a polychromatic image into a plurality of separate component images of different chromatic characteristics, comprising a fiber optic image splitter formed from a coherent bundle of light conductive fibers having an input end and an output end, and a dispersing arrangement for dispersing the polychromatic image into a plurality of beams of light of different chromatic characteristics and projecting such beams on to the input end of said bundle, the dispersing arrangement and the fibers being arranged such that beams of light of the same wavelength fall on to fibers which are grouped together at the output such that a component image of light of each wavelength is formed at the output end, and each component image is formed at its own individual region of the output end.

2. Apparatus according to claim 1, wherein the input ends of the fibers are arranged in layers and the dispersing arrangement is such that the beams of light are lined extending transverse to the direction of dispersion so that lines of light of the same wavelength fall on the layers of fibers which are grouped together at the output end.

3. Apparatus according to claim 2, wherein the dispersion arrangement includes image dissection means for separating the polychromatic image into lines spaced in a direction transverse to the direction of dispersion.

4. Apparatus according to claim 3, wherein the image dissecting means comprises light conducting optical fibers are ranged in layers.

5. Apparatus according to claim 4, wherein the dispersion arrangement includes a prism for splitting the lines of light from the image dissecting means into lines of light of different wavelengths.

6. Apparatus according to claim 3, wherein there is wavelength multiplexing means provided with said image dissecting means.

7. Apparatus according to claim 1, wherein there is optical filter means adjacent each image region of the output end of optic image splitter, each filter means being for filtering light other than the light of the desired wavelength.

8. Apparatus according to claim 1, wherein the optical fibers are flexible.

9. Apparatus according to claim 1, wherein there is wavelength multiplexing means associated with said optical image splitter.

10. A television camera comprising a fiber optic image splitter formed from a coherent bundle of light conductive fibers having an input end and an output end, and a dispersing arrangement for dispersing a polychromatic image into a plurality of beams of light of different chromatic characteristics and projecting such beams on to the input end of said bundle, the dispersing arrangement and the fibers being arranged such that beams of light of the same wavelength fall on to fibers which are grouped together at the output such that a component image of light of each wavelength is formed at the output end, and each component image is formed at its own individual region of the output end.